United States Patent
Ganapathi et al.

(10) Patent No.: US 11,334,061 B2
(45) Date of Patent: May 17, 2022

(54) METHOD TO DETECT SKILL GAP OF OPERATORS MAKING FREQUENT INADVERTENT CHANGES TO THE PROCESS VARIABLES

(71) Applicant: Honeywell International Inc., Morris Plains, NJ (US)

(72) Inventors: Ramakrishnan Ganapathi, Karnataka (IN); Prangya Priyadarsini, Karnataka (IN); Anand Narayan, Karnataka (IN)

(73) Assignee: Honeywell International Inc, Charlotte, NC (US)

( * ) Notice: Subject to any disclaimer, the term of this patent is extended or adjusted under 35 U.S.C. 154(b) by 357 days.

(21) Appl. No.: 16/600,198

(22) Filed: Oct. 11, 2019

(65) Prior Publication Data
US 2021/0109512 A1    Apr. 15, 2021

(51) Int. Cl.
*G05B 23/02*    (2006.01)
*G06Q 10/06*    (2012.01)

(52) U.S. Cl.
CPC ....... *G05B 23/0272* (2013.01); *G05B 23/027* (2013.01); *G05B 23/0264* (2013.01); *G06Q 10/063112* (2013.01)

(58) Field of Classification Search
CPC ............ G05B 23/0272; G05B 23/0264; G05B 23/027; G06Q 10/063112
See application file for complete search history.

(56) References Cited

U.S. PATENT DOCUMENTS

| | | |
|---|---|---|
| 7,920,935 B2 | 4/2011 | Knipfer et al. |
| 9,786,197 B2 | 10/2017 | Asenjo et al. |
| 2009/0299827 A1 | 12/2009 | Puri et al. |
| 2010/0289638 A1 | 11/2010 | Borchers et al. |
| 2014/0349255 A1 | 11/2014 | Watt et al. |
| 2015/0149134 A1 | 5/2015 | Mehta et al. |
| 2016/0260346 A1 | 9/2016 | Lafrinere et al. |
| 2016/0300027 A1 | 10/2016 | Jensen et al. |
| 2017/0116557 A1 | 4/2017 | Apte et al. |

*Primary Examiner* — Carlos R Ortiz Rodriguez
(74) *Attorney, Agent, or Firm* — Paschall & Associates, LLC; Mark Goldberg (57) ABSTRACT

A method, electronic device and system are provided for collecting information associated with operational changes made by plant operators. Episodes of operational changes are identified that include a triggering event and the operational changes performed are reviewed and compared to standard operating data or historical data. The operational changes that differ from such standard operating data or historical data are classified as inadvertent operations based upon a set of pre-determined characteristics. Training may follow to avoid recurrence of such inadvertent operations in the future.

12 Claims, 6 Drawing Sheets

METHOD TO DETECT SKILL GAP OF OPERATORS MAKING FREQUENT INADVERTENT CHANGES TO THE PROCESS VARIABLES

TECHNICAL FIELD

This disclosure relates generally to industrial process control and automation systems. More specifically, this disclosure relates to an apparatus and method for identifying skill gaps and knowledge gaps of personnel to prevent inadvertent errors by personnel and improve the efficiency of an industrial plant.

BACKGROUND

Industrial process control and automation systems are often used to automate large and complex industrial processes. These types of systems routinely include sensors, actuators, and controllers. The controllers are often arranged hierarchically in a control and automation system. For example, lower-level controllers are often used to receive measurements from the sensors and perform process control operations to generate control signals for the actuators. Higher-level controllers are often used to perform higher-level functions, such as planning, scheduling, and optimization operations. Human operators routinely interact with controllers and other devices in a control and automation system, such as to review warnings, alarms, or other notifications and make adjustments to controls or other operations. When a human operator responds incorrectly by performing inadvertent or incorrect solutions to an alarm or warning the overall efficiency of a plant deteriorates.

It is the responsibility of the process operator in an industrial plant to ensure optimal process operation. To achieve such optimal process operation, operators will maintain critical process values within a recommended band that is bound by optimal upper and lower limits. For safe operation, all the process values have to be maintained within a set of lower and upper alarm limits. In case of any violations of those limits, the process plant's distributed control system (DCS) will notify the operator with a low/high alarm relative to the alarm limits. The operator will then need to increase or decrease a manipulated variable such as feed rate, temperature, pressure and others and return the process to normal operations. Sometimes the operator may make an erroneous change to the variable contrary to the recommended change (either an increase or decrease). Such inadvertent incorrect operation may indicate a pattern of gaps in the operator's competency or a lack of reflexes to meet process emergencies or negligence such as inattention. Responding to alarms with such erroneous changes could lead to accidents or a longer time in resolution of the alarm.

Usually, the operators change the operatable parameters (OP) or set point values (SP) to control the process values. Currently there are no means to detect whether the operator was aware of the impact of changes while making changes to OP parameters. In such situations, the operator may make frequent and quick changes in opposing directions or speed relative to the process leading to sub-optimal plant performance and delayed normalization of alarm situations.

There are different types of process control types in a plant, such as Single Input Single Output (SISO), Multiple Input and Multiple Output (MISO), Multiple Input and Multiple Output (MIMO) and Single Input and Multiple Output (SIMO), and operations done by an operator, by changing values to control a direction, speed or choosing between redundant systems.

In such process control systems operator changes the OP values to control the process. But there are no means to detect if the changes made by the operator were correct and not too fast that the process could not accommodate. During alarm response if the OP values were increased and decreased in a very short duration that might lead to large process oscillations and longer time to normalize the alarm thereby impacting the process and plant performance. Thus, to enable appropriate trainings to an operator for their better understanding of the DCS front end for improving the plant performance it is important to detect inadvertent changes to the process which lead to sub optimal plant operations and degrade the plant performance.

An example of the type of possible inadvertent change to the process would be one where the operator throttled a value back to 40% from 50% but then the data shows that the operator returned the value to 50% within just three seconds. Such changes within a small window of time may not be the correct response.

Another example of a possibly inadvertent change to a process would be a situation where the operator changed the setting for a pump motor from the STOP to the RUN state and then from the RUN to the STOP state, all within 3 seconds. The data also shows that a second pump motor was sopped 4 seconds later, indicating that the first pump motor had been inadvertently stopped in place of the second pump motor.

It is these types of situations as well as others that may occur during operations where it is desirable to have a method to automatically detect such inadvertent changes to the process.

SUMMARY OF THE INVENTION

The invention provides a method to automatically detect inadvertent operator actions which would lead to sub optimal plant operations and degrade the plant performance. The proposed solution uses the data from the distributed control system such as configuration data, event and alarm data, process changes that had been archived and real-time process data as well as other data to identify operator changes such as those having been made to process speed, direction, and selection among redundant systems. To detect inadvertent operator actions the automated solution identifies the type of change being made by the operator from alarms and events data including control of the direction and selection of drives and valves. The automated solution identifies single or multiple operator actions for optimal plant operations or alarm normalization/resolution. It detects the time duration between operator actions. The automated system also calculates the time taken for the operator actions to take effect on the process from the process data, control configuration data and their previous operator actions. Finally, it makes a determination as to whether the operator actions should be considered to be inadvertent.

The invention provides an opportunity to accurately identify skill gaps and assess the competence of operators. In addition, it can lead to the development of appropriate training offerings. It allows customers to have data driven insights regarding plant operator actions and provide interventions to improve plant productivity.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Industrial process control and automation systems require maintenance and upkeep as well as rapid response to various alarms and warnings to maintain the industrial plant in an efficient, safe, and productive environment. In addition to the automation various personnel are required to make decisions and perform maintenance to ensure the industrial process control and automation systems run under normal operating conditions. The individual personnel can include process operators, system maintenance engineers, control engineers, field engineers, technicians, and the like.

Managing the large workforce of individuals and technicians is critical for the efficient operation of industrial process, control, and automation systems within an industrial plant. For example, individuals of varying skill and knowledge can lead to inconsistent operations during various shifts. Maintaining a high-quality workforce of individuals and technicians requires each group of individuals to have a defined skill set, a way measure the skills and identify any gaps in a skill set, as well as provide personalized training to fill the identified gaps. By educating the operators and engineers on the areas only where an identified gap is present improves efficiency as the personnel are not required to undergo general training for various skills that that various personnel are not deficient in.

Due to the continual development of technology, the workforce and personnel who oversee an industrial plant are required to continually update their skill set in order to efficiently operate new equipment and the like. One method to assess the skills of individual is through assessment techniques like tests, to determine and identify on the job competency. Another method to assess the skills and competency of an individual is through analytics and monitoring responses to various warnings, alarms captured while each personnel is performing their daily tasks in the management and oversight of the industrial plant.

Embodiments of the present disclose include methods and systems to assess the various personnel such as process operators, system maintenance engineers, control engineers, field engineers, technicians and the like, based on identifying best practices, while remaining with the rules and standards of operating the industrial plant. While the various operators, system maintenance engineers, control engineers, field engineers, technicians and the like perform various tasks while maintaining and overseeing the industrial plant, analytical systems are used to record and analyze the various responses each individual perform in response to an alarm or warning as well as preventative maintenance procedures.

Figure 1:
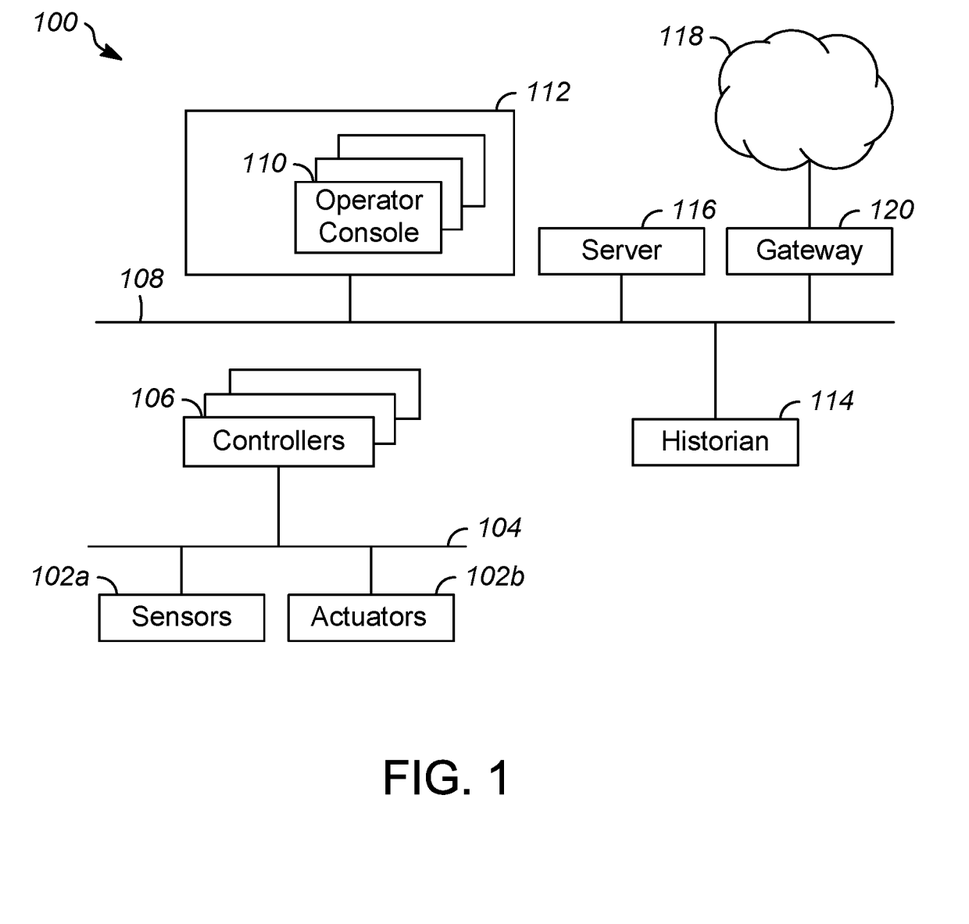
FIG. 1 illustrates an example of an industrial process control and automation system according to this disclosure.

FIG. 1 illustrates an example of an industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system, such as valve openings. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. For example, a controller 106 could receive measurement data from one or more sensors 102a and use the measurement data to generate control signals for one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples to the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving set points or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. The servers can be located locally or remotely from the control and automation system 100. For instance, the functionality of the server 116 could be implemented in a computing cloud or a remote server communicatively coupled to the control and automation system 100 via a gateway such as gateway 120. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In accordance with this disclosure, managing the competency and skill level of an industrial plant's workforce is critical for an efficient plant operation. Process control and maintenance of an industrial plant can require a large workforce of personnel covering various aspects of the industrial plant. In certain embodiments, the personnel are categorized into various groups such as, process operators, system maintenance engineers, control engineers, field engineers, and the like. The various components of defining competency can include defining skills needed for each group, identifying gaps of individuals against the identified skills, and training the personnel to reduce knowledge gaps. For example, the competency of an operator can be measured established as how efficiently each operator responds to an alarm or warning. In another example, the competency of maintenance engineers can be measured as how efficiently each maintenance engineer configures a system or subsystem. In another example, the competency of a field engineer can be measured as how efficiently the field engineer is at maintaining the various devices and equipment at the industrial plant. For example, by collecting and analyzing data on the various tasks that each personnel performs during the operation of an industrial plant, embodiments of the present disclosure provides real-time information and guidelines on how the various personnel can respond to each event in an efficient and safe manner. By analyzing each personnel and identifying skill areas where individual personnel are less efficient than others provides an indication that by providing additional training in a specific area will affect the overall efficiency of the industrial plant.

Although FIG. 1 illustrates one example of an industrial process control and automation system 100, various changes may be made to FIG. 1. For example, the control and automation system 100 could include any number of sensors, actuators, controllers, servers, networks, operator stations, operator consoles, control rooms, historians, networks, and other components. Also, the makeup and arrangement of the system 100 in FIG. 1 is for illustration only. Components could be added, omitted, combined, further subdivided, or placed in any other suitable configuration according to particular needs. Further, functions have been described as being performed by particular components of the system 100. This is for illustration only. In general, control and automation systems are highly configurable and can be configured in any suitable manner according to particular needs. In addition, FIG. 1 illustrates one example operational environment of an industrial plant where system operations done by the various personnel can be monitored. This functionality can be used in any other suitable system, and that system need not be used for industrial process control and automation.

Industrial processes can be implemented using large numbers of devices, such as pumps, valves, compressors, or other industrial equipment. Similarly, industrial process control and automation systems can be implemented using large numbers of devices, such as the sensors 102a, actuators 102b, controllers 106, and other components in FIG. 1. Various networks can be used to couple these devices together and transport information.

Figure 2:
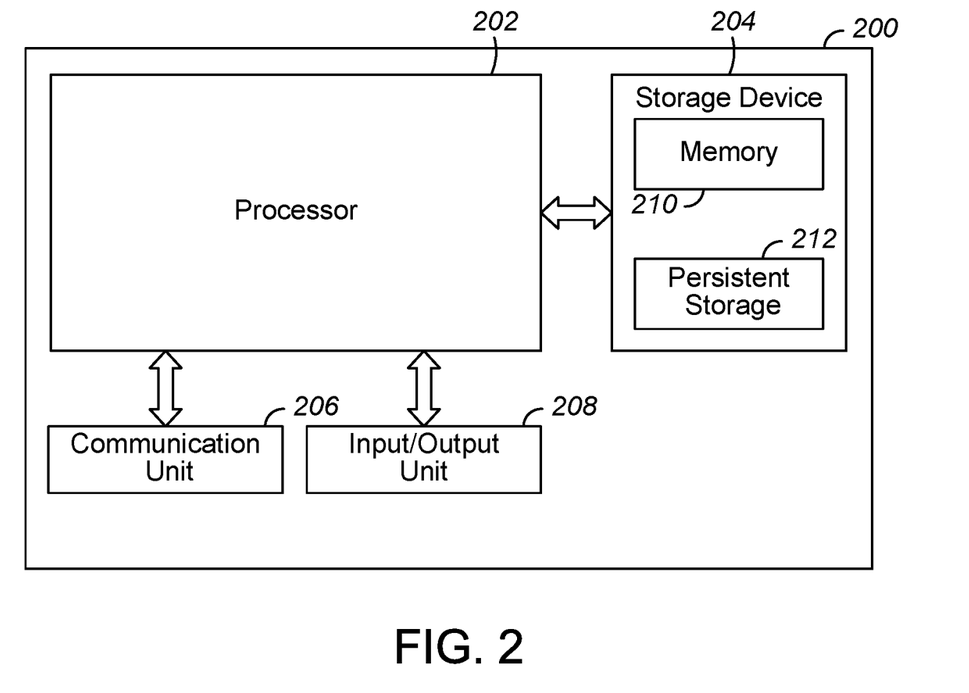
FIG. 2 illustrates an example of a computing device for competency assessment according to this disclosure.

FIG. 2 illustrates an example device for competency assessment according to this disclosure. In particular, FIG. 2 illustrates an example computing device 200. In some embodiments, the computing device 200 could denote an operator station, server, a remote server or device, or a mobile device. The computing device 200 could be used to run applications. The computing device 200 could be used to perform one or more functions, such as collecting information, sorting and analyzing the information as well as generating a report of the analysis. For ease of explanation, and the computing device 200 are described as being used in the system 100 of FIG. 1, although the computing device 200 could be used in any other suitable system (whether or not related to industrial process control and automation).

As shown in FIG. 2, the computing device 200 includes at least one processor 202, at least one storage device 204, at least one communications unit 206, and at least one input/output (VO) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random-access memory or any other suitable volatile or non-volatile storage device(s). The persistent storage 212 may contain one or more components or devices supporting longer-term storage of data, such as a read-only memory, hard drive, flash memory, or optical disc.

The communications unit 206 supports communications with other systems or devices. For example, the communications unit 206 could include at least one network interface card or wireless transceiver facilitating communications over at least one wired or wireless network (such as a local intranet or a public network like the Internet). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates example computing device 200 capable of identifying skills and competency gaps various changes may be made to FIG. 2. For example, various components in FIG. 2 could be combined, further subdivided, or omitted, and additional components could be added according to particular needs. As a particular example, processor 202 can be divided into multiple processors, such as one or more central processing units (CPUs) and one or more graphics processing units (GPUs). Also, computing device 200 can come in a wide variety of configurations, and FIG. 2 does not limit this disclosure to any particular computing device or mobile device.

As noted above, numerous individuals are required for the efficient and effective running of an industrial plant that utilizes various process control and automation systems. When one of the individuals responds slowly to a warning or alarm, performs the remediating action slowly, fails to perform preventative maintenance, or constructs a system poorly, the efficiency and productivity of the plant drop. Embodiments of the present disclosure provide analytical systems that analyze the various responses to identify the skill and knowledge gaps of the individuals while the various operators, maintenance engineers, system engineers, field engineers, and the like perform their respective tasks. For example, while the various operators, system maintenance engineers, control engineers, field engineers, technicians and the like perform their tasks on the various operator stations, analytical systems are used to record and analyze the various responses each individual performs in response to an alarm or warning as well as preventative maintenance procedures. The analysis of these data and the access of the real-time process data provide guidelines for operators in various responses to the process alarms in an efficient and safe manner.

As noted above, numerous individuals are required for the efficient and effective running of an industrial plant that utilizes various process control and automation systems. When one of the individuals responds slowly to a warning or alarm, performs the remediating action slowly, fails to perform preventative maintenance, or constructs a system poorly, the efficiency and productivity of the plant drop. Embodiments of the present disclosure provide analytical systems that analyze the various responses to identify the skill and knowledge gaps of the individuals while the various operators, maintenance engineers, system engineers, field engineers, and the like perform their respective tasks. For example, while the various operators, system maintenance engineers, control engineers, field engineers, technicians and the like perform their tasks on the various operator stations, analytical systems are used to record and analyze the various responses each individual performs in response to an alarm or warning as well as preventative maintenance procedures. The analysis of these data and the access of the real-time process data provide guidelines for operators in various responses to the process alarms in an efficient and safe manner.

Figure 3:
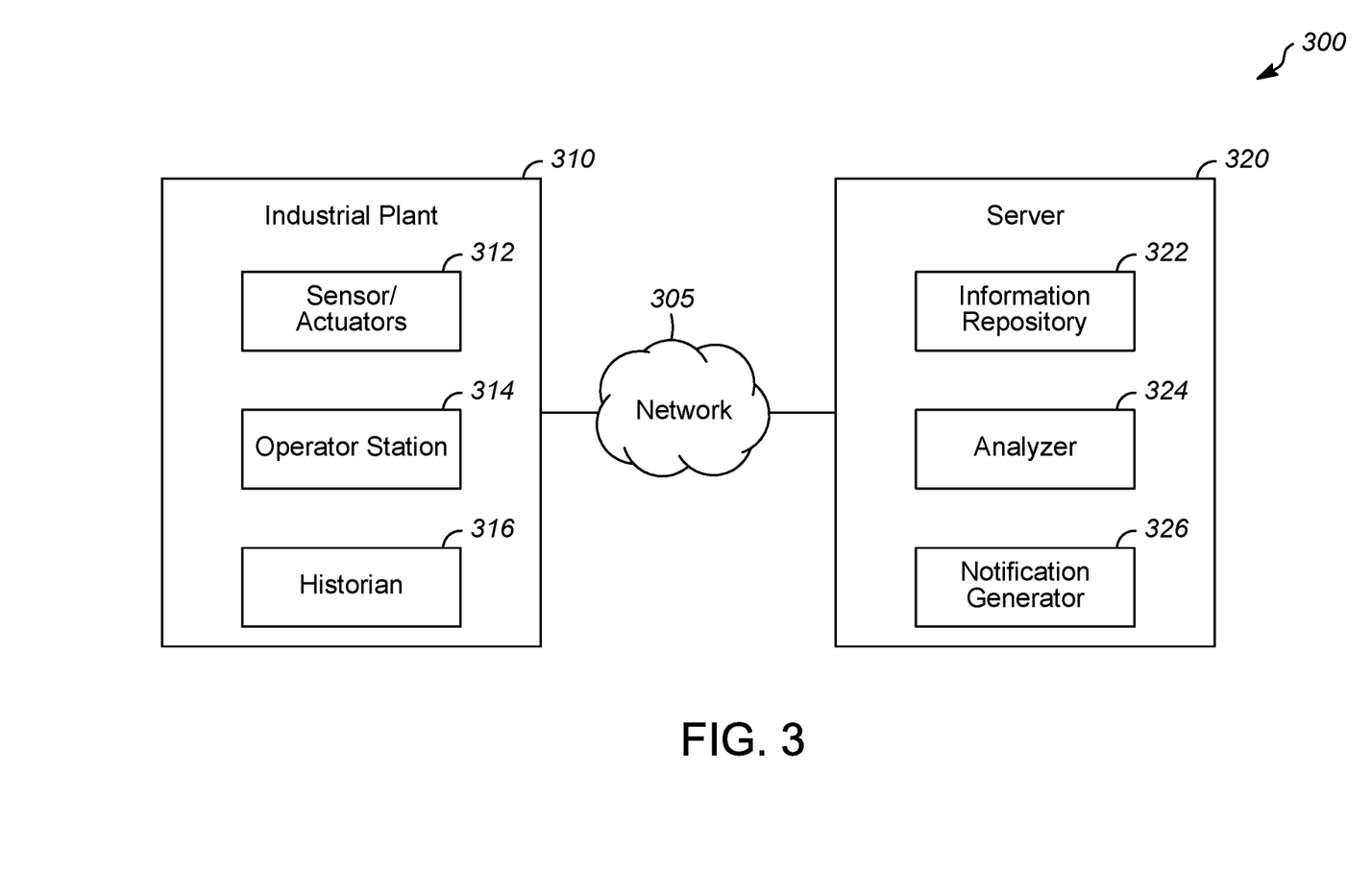
FIG. 3 illustrates an example block diagram of a communication system according to this disclosure.

FIG. 3 illustrates an example block diagram of a communication system according to this disclosure. The embodiment of the high-level architecture 300 as shown in FIG. 3 is for illustration only. Other embodiments can be used without departing from the scope of the present disclosure. The high-level architecture 300 includes an industrial plant 310 and a server 320 in communication over network 305.

Network 305 is used to provide communication between the industrial plant 310 and the server 320. In certain embodiments, network 305 is similar to network 104 of FIG. 1. In certain embodiments, network 305 is similar to network 108 of FIG. 1. Network 305 can be personal area network (PAN), Local Area Networks (LANs), Wireless Local Area Networks (WLANs), the Public Switched Telephone Network (PSTN), as well as other wireless networks. Network 305 may also be the Internet, representing a worldwide collection of networks and gateways that use Transmission Control Protocol/Internet Protocol (TCP/IP) protocols to communicate with one another. Network 305 includes a cable, a router, switches a firewall, or a combination thereof (not depicted). Network 305 can include a variety of connections, such as, wired, wireless or fiber optic connections.

Industrial plant 310 is similar to industrial process control and automation system 100 of FIG. 1. The industrial plant 310 represents one or more industrial plants. The industrial plant 310 generally represents any system or portion thereof configured to process one or more products or other materials in some manner. The industrial plant 310 includes sensors and actuators 312, at least one operator station 314, and a historian 316.

The sensors and actuators 312 are similar to the sensors 102*a* and the actuators 102*b* of FIG. 1. In certain embodiments, sensors and actuators 312 also include equipment that is controlled by the automation system. The sensors and actuators 312 represent components in the industrial plant that perform any of a wide variety of functions. For example, sensors and actuators 312 measure various characteristics of the process system as well as alter any number of characteristics in the process system of the industrial plant 310. The sensors and actuators 312 can be automatically controlled by the process system of the industrial plant 310, manually controlled, or a combination thereof. The control and manipulation of the sensors by the personnel or the process system of the industrial plant 310, or the combination thereof can be recorded by the historian 316, discussed in further detail below. For example, each time the sensors and actuators 312 are adjusted, a record is created within the historian 316. When an analysis is performed, such as through analyzer 324, discussed in further details below the competency and skill level of the individual personnel who adjusted the sensors and actuators 312 can be assessed.

The operator station 314 is similar to the operator console 110 or the control rooms 112 of FIG. 1. Each operator station 314 represents computing or communication devices providing user access to the machine-level controllers, such as controllers 106 of FIG. 1. In certain embodiments, the operator consoles 110 receive and display warnings, alerts, or other messages or displays generated by various controllers of the industrial plant 310. The operator station 314 allows a user to enable or disable the various automatic controls to control the operation of the industrial plant 310. The operator stations 314 can also allow the user such as an operator to adjust the operation of the sensors and actuators 312 during the operation of the industrial plant 310. The operator station 314 allows users to review the operational history of sensors and actuators 312. In addition, each of the operator stations 314 can include any suitable structure for supporting user access and control of one or more components.

The historian 316 is similar to the historian 114 of FIG. 1. The historian 316 represents any suitable structure for storing and facilitating retrieval of information. The historian 316 can be implemented using any architecture known in the art such as, for example, a relational database, an object-oriented database, or one or more tables, or a combination thereof. The various information and data stored within the historian 316 can include confidential information, proprietary information, personnel information, operational history of the industrial plant 310, and the like. Although shown as a single centralized component within the industrial plant 310, the historian 316 could be located elsewhere in the high-level architecture 300, or multiple historians could be distributed in different locations in the high-level architecture 300. For example, the historian 316 can be a server or a remote server or a "cloud" of computers interconnected by one or more networks utilizing clustered computers and components to act as a single pool of seamless resources, accessible to industrial plant 310, the server 320, or both, via network 305.

The historian 316 could, for instance, store information associated with the operation of the industrial plant. For example, the historian 316 can maintain one or more logs that include the warnings, alarms, maintenance records, and process changes during the operation of the industrial plant 310. In certain embodiments, the following data can be collected by the historian 316: (i) Process alarms, (ii) Operator Process changes; (iii) System alarms; (iv) System status/events; (v) Engineering configuration changes; (vi) Piping and Instrumentation Diagrams and control narratives of process; (vii) Shift roasters and log-on information of stations; (viii) Maintenance records (Asset Management/ Others); and the like. For example, process alarms include warnings and alarms that occur when one or more sensors detect a measurable characteristic that falls outside of an identified parameter. In another example a process alarm can occur when an actuator or another piece of equipment malfunctions. In another example, a process alarm can occur as a result of an operator action. For instance, an alarm can sound when an operator increases or decreases a setting beyond capabilities of the sensor, actuator, output parameter, and the like. Operator process changes occur when an operator or other person changes one or more processes, parameters, of the automation system of the industrial plant 310. System status and events occur when any parameter changes during the operation of the industrial plant 310. Engineering configurations include various changes that a MAINTENANCE engineer applies in the control system, such as changes to the control/system/network behavior of various components of the industrial plant 310.

Server 320 is similar to the server 116, the computing cloud 118, or a combination there of, of FIG. 1. Server 320 can be configured similar to the computing device 200 of FIG. 2. Server 320 can be a web server, a server computer such as a management server, or any other electronic computing system capable of sending and receiving data. In certain embodiments, the server 320 is a "cloud" of computers interconnected by one or more networks, where the server 320 is a computing system utilizing clustered computers and components to act as a single pool of seamless resources when accessed through network 305. In certain embodiments, the server 320 can also exist in cloud with appropriate connecting channel to a Distributed Control System (DCS). In certain embodiments, the server 320 can be used to provide assess an operator while responding to alarms. These measures improve the safe operation of the process as well its efficiency. In certain embodiments, the server 320 provides analytics to identify gaps in the in the competency of operators in responding to alarms in an efficient way. In certain embodiments, the server 320 provides analytics to identify gaps in the competency of maintenance engineers to correctly configure the system. In certain embodiments, the server 320 provides analytics to identify gaps in the competency of field engineers to correctly maintain the devices. In certain embodiments, the various analytical and identification methods and systems can be bundled as a single solution to generate periodic gap reports. In certain embodiments, the various analytical and identification methods and systems can be utilized for on the job competency assessments or re-assessments. Server 240 includes an information repository 322, an analyzer 324, and a notification generator 326.

The information repository 322 can be similar to storage device 204 of FIG. 2. In certain embodiments, the historian 316 and the information repository 322 are the same entity within the high-level architecture 300. The information repository 322 can be implemented using any architecture known in the art such as, for example, a relational database, an object-oriented database, or one or more tables, or a combination thereof. The information repository 322 stores data that is collected from the industrial plant 310, an external source, or both.

In certain embodiments, the various operations performed during the operation of the industrial plant 310 are continually recorded by the historian 316. For example, the information repository 322 collects the recorded events and records from the historian 316 for processing. In another example, the information repository 322 is a control database that collects or receives various engineering configurations associated with the operation of the industrial plant.

In certain embodiments, the information repository 322 can collect all the information from the historian 316 and parse through the information. In certain embodiments, the information repository 322 can determine which records are applicable for deriving the skill level of personnel and select the specific records. For example, the information repository 322 can select records that concern with alarms, process changes, maintenance records, system changes, and the like.

The information repository 322 stores data that is used in the analysis to identify competency gaps within the personnel of the industrial plant 310. In certain embodiments, at least a portion of the information collected, and maintained by the historian 314 can be included in the information repository 322. For example, the information repository 322 can include all the information included in the historian. In another example, the information repository 322 can include one or more specific categories of data such as (i) Process alarms, (ii) Operator Process changes; (iii) System alarms; (iv) System status/events; (v) Engineering configuration changes; (vi) Piping and Instrumentation Diagrams and control narratives of process; (vii) Shift roasters and log-on information of stations; or (viii) Maintenance records (Asset Management/Others).

In certain embodiments, the following data can also be maintained in the information repository 322: (i) Engineering configurations; (ii) SOP/Operator Guidelines; (iii) System Performance Baseline (SPB) and Integrated Automation Assessment (IAA), if available; (iv) Custom graphics; and the like. In certain embodiments, the information repository 322 is a control database that maintains or receives various engineering configurations. In certain embodiments, the information repository 322 receives and stores the various engineering configurations from a control database. Engineering configurations can be collected from control database, whereas engineering configuration changes are collected by the historian 314. The SOP I operator guidelines can be collected from a user as an input or data entry. Operator guidelines include procedures and guidelines that the various personnel of the industrial plant 310 are instructed to follow. For instance, the operator guidelines can include how each personnel responds to a particular alarm. SPB performs an analysis of the utilization and throughput of the systems of the industrial plant 310 and can generate recommendations for improvement. SPB can also generate a report after the industrial plant 310 receives an upgrade. The SPB is a report that is provided by DCS vendors. The SPB report, for example can be prepared by experts in the field that indicate ideal and proper procedures and reposes as well as various industry standards associated with the industrial plant 310. The IAA is a generated report from another aspect of the industrial plant 310 issues with the equipment of the industrial plant 310.

The analyzer 324 analyzes the individual personnel at the industrial plant 310 to identify competency gaps. For example, the analyzer 324 analyzes the individual personnel based on how each individual responds to an alarm or warning, how the individual performs an install as well as how the individual configures various aspects of the industrial plant 310.

Analyzer 324 sorts all the information collected by the information repository 322, to identify competency gaps or deficient skills in certain personnel of the industrial plant 310. Analyzer 324 parses information within the information repository 322 such as, history, configuration, and the like. Analyzer 324 sorts the information into groups. In certain embodiments, each group indicates a particular skill associated with the running and operating the industrial plant 310. For example, one group can include all responses performed by personnel when a specific alarm occurs. In another example, another group can include all preventative maintenance performed on a type of equipment. In another example, one group can include particular changes executed by personnel to the processes of the industrial plant.

In certain embodiments, analyzer 324 receives a set of skills from a third-party server. The received set of skills indicates various groups that the analyzer 324 is to sort the relevant information into. In certain embodiments, the analyzer 324 derives skills from the information maintained in the historian 314, the information repository 322, or both, and then sorts the relevant information into the respective group. For example, the analyzer 324 deriver patterns from the information. The patterns can indicate various responses that the personnel performed when responding to alarms. The patterns can indicate various changes the personnel executed when adjusting parameters of the automated process of the industrial plant 310. The patterns can indicate various warnings and errors that occurred while particular personnel oversaw the various equipment. After deriving a new skill, the analyzer 324 generates a new group that relevant information can be sorted within.

In certain embodiments, the analyzer 324 can identify episodes. An episode includes the start of an alarm or warning through the return of normal operating conditions as well as all the changes the operator executed within the system to return the system to normal operating conditions. Stated differently an episode spans the time between an alarm event and the corresponding return to normal event. The analyzer 324 can identify the number of changes the operator executed to return the system to normal operating conditions. Additionally, the analyzer 324 can identify the duration of time it took the operator to return the system to normal operating conditions.

In certain embodiments, the analyzer 324 can derive the time between an alarm event and the corresponding first action by an operator. For example, the analyzer can assess the time duration it takes a single operator to start responding to an alarm. In certain embodiments, the analyzer 324 can identify when the operator is addressing prior issue and therefore disregard any time delay in addressing the alarm that occurs while the operator is addressing the first alarm.

In certain embodiments, the analyzer 324 can assess the information within each group to identify a bench mark. A bench mark is the best response to or action taken as a result of a given skill or task. In certain embodiments, a bench mark episode is the integral of the difference between the actual and alarm trip point during the span of the alarm, identified as an index value. The index value is the value associated with each instance the processing values associated with the operation of the industrial plant 310 exceeds an alarm trip point. The alarm trip point is a value or parameter that a processing value associated with the operation of the industrial plant 310 is not to exceed. The bench mark is identified as the smallest highlighted area of similar alarms. In certain embodiments, a bench mark is the quickest response, the fewest number of changes of a combination thereof, while violating no plant rules or engineering guidelines to resolve a warning or an alarm. For example, the bench mark response to an alarm is the duration of time taken or the number of changes the operator executed to return the system to normal operating conditions, as compared to the other responses to a similar alarm type. In another example, the bench mark response to a system process is how many errors were generated while the new process is executed, how many guidelines the process violated, or the like, as compared to other similar processes. The analyzer 324 can then compare the data within each group to the bench mark. In certain embodiments the bench mark is identified in a report, and each episode is compared to the identified bench mark. For example, the report can be received from an external source or generated and provides instructions on responding to various types of alarms.

The analyzer 324 then ranks the information within each group. For example, the analyzer 324 assesses responses or the actions performed by each personnel, with respect to each identified skill, in order to rank (or rate) the personnel within each group. For example, analyzer 324 performs analytics to uncover hidden competency gaps within the personnel at the industrial plant 310.

The analyzer 324 can rank or rate operators in their response to alarms and running the various processes of the industrial plant 310 optimally. For example, the analyzer 324 analyzes a selection of alarms within a particular alarm grouping and identifies a correct quantitative response. The correct quantitative responses can include increments or rate of manipulations executed by each operator in order to resolve the alarm and return the process to a non-alarm state. The analyzer 324 can also assess the response to of each operator for particular alarms. For example, the response time can include the total time it takes an operator to resolve the issue. In another example the response time can include the time it took the operator to commence addressing the alarm. The analyzer 324 can also assess the operator's responses based on avoiding inadvertent operations while responding to a particular alarm. For example, the analyzer 324 can identify operations that an operator executed that are unnecessary, redundant, or wrong incorrect when responding to an alarm state.

In certain embodiments, the analyzer 324 can rank or rate personnel by assess an alarm episode characteristic and the operator's response to the alarm. For example, the analyzer 324 can derive the time between an alarm and the first action of an operator as well as the time between the start of the alarm event and the return to normal event. The analyzer 324 can also derive the maximum deviation of the trip point. The trip point is the value configured for the alarm event to trigger. For example, the trip point indicates a value as to when an alarm occurs based on one or more system parameters. The analyzer 324 can also derive the time between an alarm event and the maximum deviation from the trip point. The analyzer 324 can then map a portion or all the information to compare each operator.

The analyzer 324 can also rank or rate control system maintenance engineers based on minimizing defects in the control configurations and process optimization skills. For example, the analyzer 324 can assess when a particular configuration violates a Front End Engineering Design (FEED) rule. FEED rules include various rules and conventions to be followed during the operation of the industrial plant 310. In another example, the analyzer 324 can assess when a particular configuration contains logical errors. The analyzer 324 can also rank or rate control system maintenance engineers based on implementation of custom graphics such as optimization of parameter access. The analyzer 324 can also rank or rate control system maintenance engineers based on alarm configurations, advanced application data access optimization, controller input and outputs, SPB reporting, or a combination thereof.

In certain embodiments, the analyzer 324 can compare each of the personnel to the derived bench mark. For example, bench marks can be established based on how an operator responds to an alarm as well as an engineer is able to establish a control configuration with minimal defects. Thereafter the analyzer 324 compares the information within each group to the derived bench mark. The closer each personnel is to the bench mark the higher the rank, and conversely the further away each personnel is from the bench mark the lower the rank.

In certain embodiments, the rank of each personnel is a rating that indicates how well each individual performs with respect to the bench mark or the peers of the individual. For example, if all the personnel within a particular episode group respond similarly, the rating of the personnel will be similar.

The notification generator 326 generates reports that include a listing of personnel whose skill falls is below a threshold. The notification generator 326 can also generate reports that indicate personnel who are associated with a bench mark or have actions that are approaching a bench mark. The notification generator 326 can be performed routinely, periodically or on demand. For example, a report can be generated once every month, quarter, year, or the like. The report indicates competency gaps or skills that particular personnel could use additional education to overcome the deficiency. The report can also include a listing of the best practices of process operations. The reports can also include exceptions that were not considered while assessing a potential competency gap for each personnel.

In certain embodiments, the notification generator 326 outputs the skill deficiencies to a training module that can generate a personalized training simulation for each personnel whose skill was below the threshold. For example, the training simulation for each personnel can be based on the bench mark.

Figure 4:
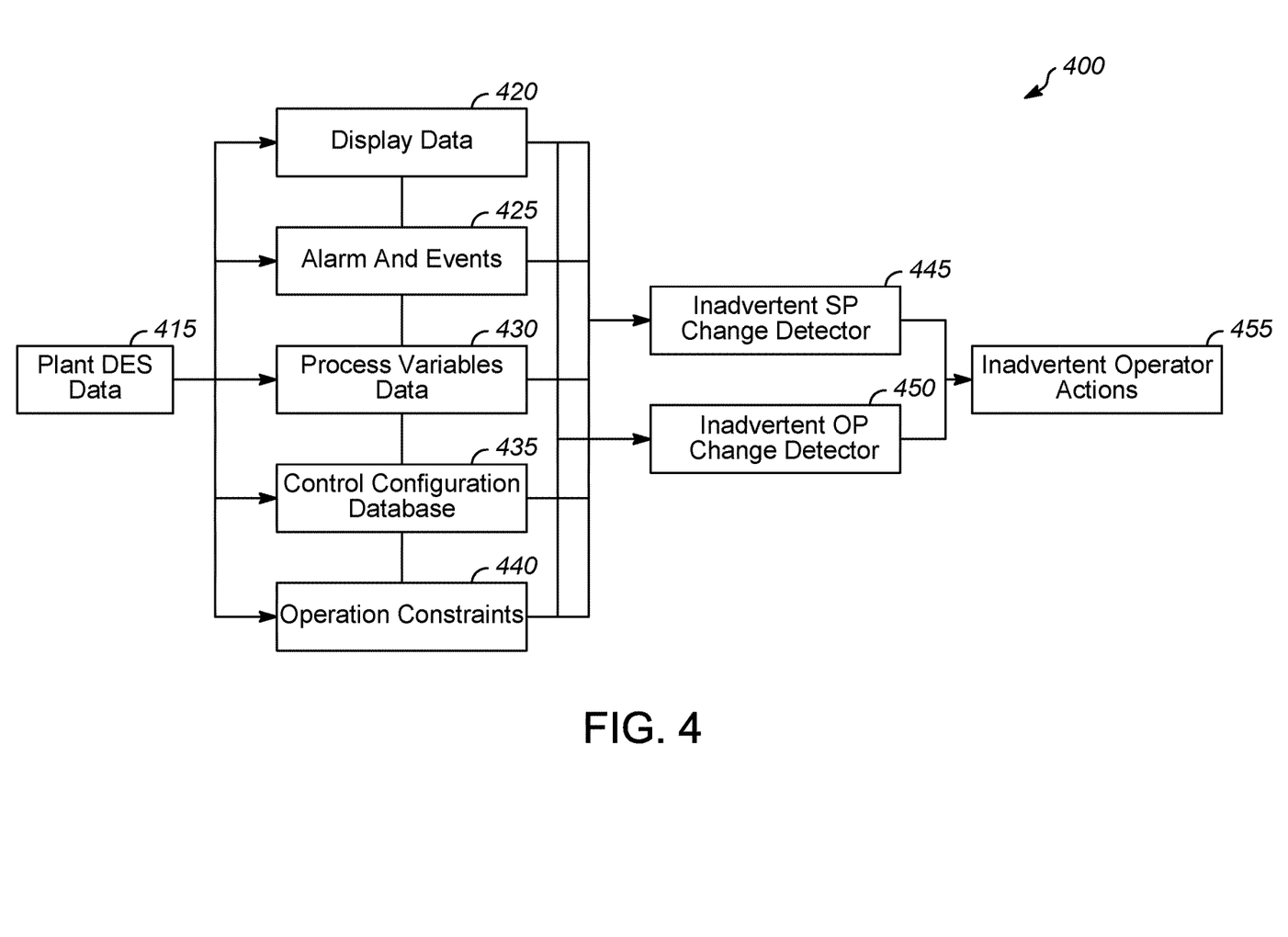
FIG. 4 shows an overview of the integration of the system to determine inadvertent operator actions with the digital control system.

FIG. 4 shows a solution overview 400 of the components that are included in analyzing the data and determining inadvertent operator actions. In FIG. 4 are shown plant DCS data such as display data 420, alarms and events 425, process variables data 430, control configuration database 435, operational constraints 440. The preceding information are interpreted by inadvertent SP change detector 445 and inadvertent OP change detector 450. Then the result of interpreting the data as explained in connection with FIGS. 5 and 6 result in the identification of inadvertent operator actions 455. Plant DCS data can be used to analyze the operable tags and their relation for resolving alarms.

Figure 5:
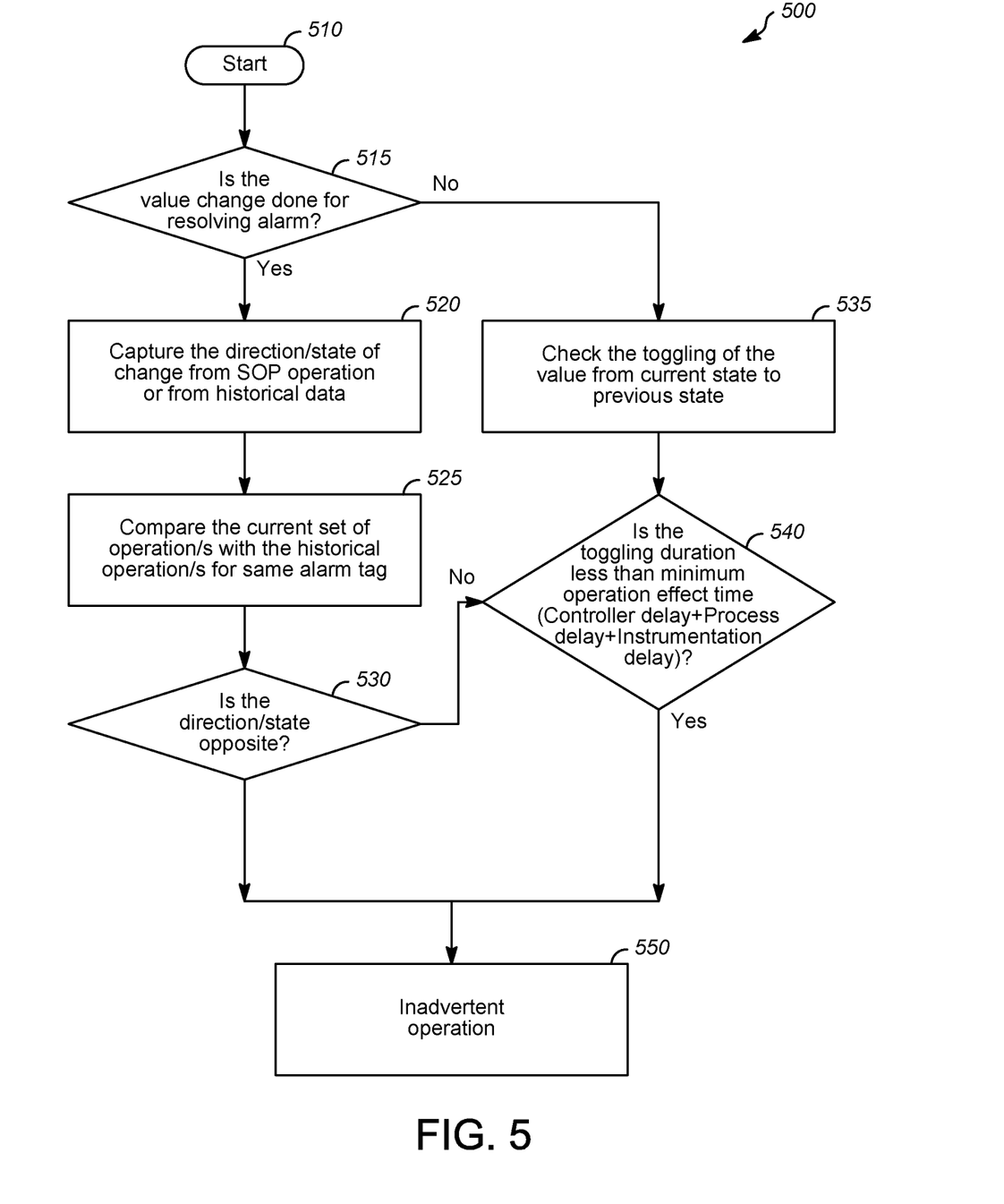
FIG. 5 shows a flow chart for the operation of the inadvertent operator change detector.

FIG. 5 provides a flow chart 500 for an inadvertent operator change detector. At a start 510 one proceeds to decision point 515 to answer whether a value change was as a result of or in response to resolving an alarm. If the answer is yes, then in box 520, the direction and state of change is captured as compared to standard operating procedure operations or from historical data. Then in box 525, the current set of operations are compared with the historical operations for the same alarm tag. At decision point 530, it is determined whether the direction or state is opposite from the historical operations. If it is opposite, then the toggling duration is measured 540 with regards to it being of a lower duration than a minimum operation effect time after taking into consideration controller delay, process delay and instrumentation delay and if the decision is positive then it is concluded that there was an inadvertent operation 550. Similarly, if the decision point is that the direction is not opposite, the duration is measured and if the toggling duration is less than a minimum duration when compared to the standard and historical data, then the conclusion is that it is an inadvertent operation 550. In addition, if the decision is "no" from decision point 515, the analysis is to check the duration of the toggling of the value from the current state to the previous state at 535. Then as noted above, if the toggling duration 540 is less than the minimum operation effect time, then the result of the analysis is that there was an inadvertent operation 550. If the toggling duration is not less than the minimum operation time, then the question at 530 is analyzed and a "yes" result again is determined to be an inadvertent operation 550.

Figure 6:
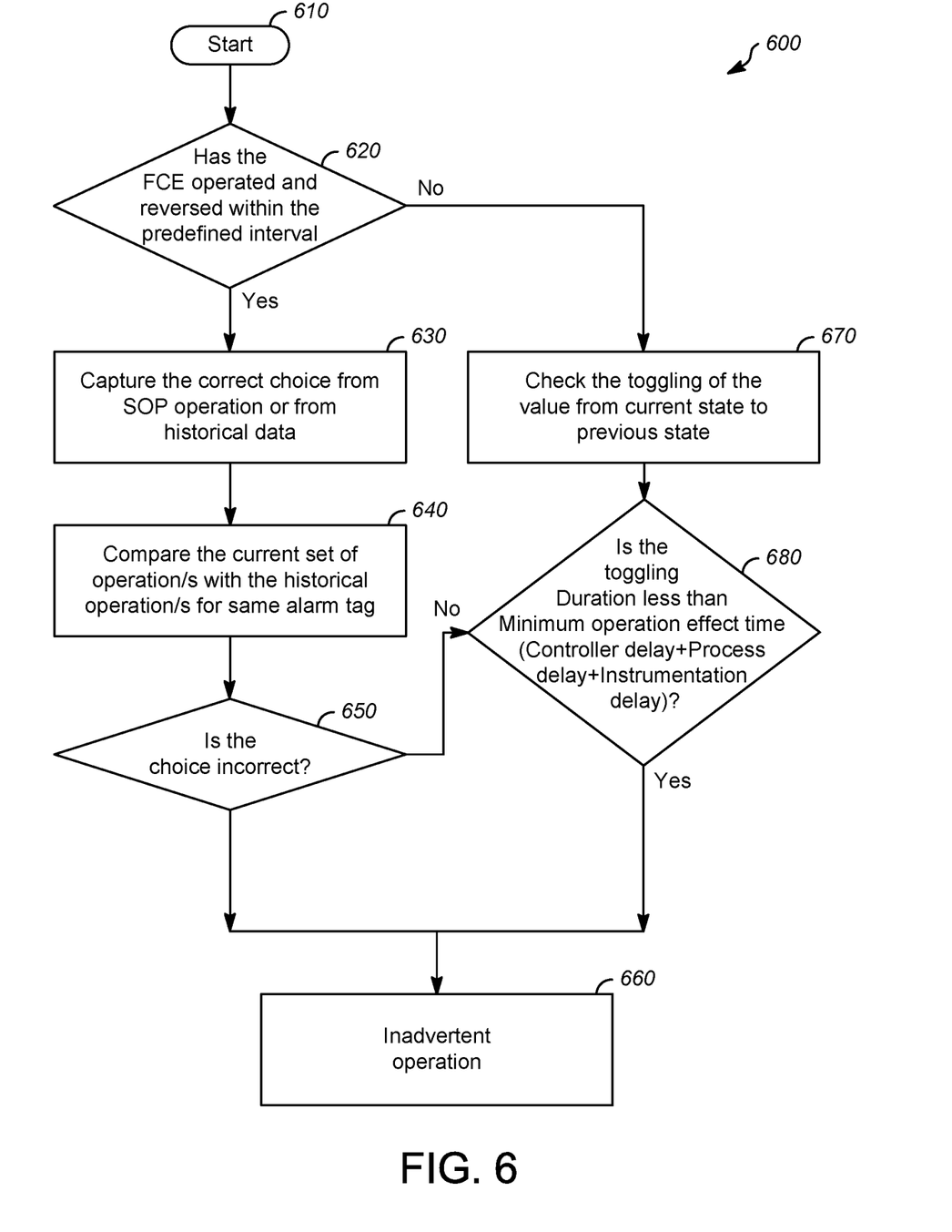
FIG. 6 shows a flow chart for determination of selection of drives or final control elements.

In FIG. 6 is shown a flow chart 600 for determining whether there was an inadvertent selection of drives or final control elements (FCE). A similar flow chart may be used to analyze other actions that may change the operation of an industrial process and result in an inadvertent operation. The analysis starts at 610 and the first decision 620 is whether the final control elements operated and reversed within a predefined interval. If the answer is "yes", then the capture of the correct choice from standard operating procedures or historical data is determined at 630 with a comparison of the current set of operations with the historical operations for the same alarm tag at 640. The choice of response is evaluated at 650 so that if the decision was "yes" it is considered to be an inadvertent operation 660. If the decision 620 is "no", then the toggling of a value from the current state to a previous state is analyzed and if the toggling duration is less than a minimum operation effect time, minus controller delay, process delay and instrumentation delay, then it is an inadvertent operation 660. However, if it is not such a minimum toggling duration, the toggling is reviewed and if it is incorrect, there still may be found to be an inadvertent operation present. These are a few of the possible steps that can be taken in accordance with the invention in determining whether there has been an inadvertent operation. Training may be designed to then reduce the occurrence of such inadvertent operations that can result in reductions in quality, yield, and time.

The invention claimed is:

1. A method comprising
   a. collecting information associated with operational changes by personnel that operate an industrial plant;
   b. identifying episodes of the operational changes, wherein each of said episodes includes a triggering event and the operational changes performed by each of the personnel in response to the triggering event;
   c. generating a causal pairing matrix that categorizes the identified episodes into a plurality of groupings, wherein each of the groups includes at least two episodes that are related based on the triggering event of each of the at least two episodes being similar;
   d. comparing the identified episodes for changes in direction or states of change;
   e. collecting data that categorizes either standard operating procedure data or historical data of operational changes
   f. comparing said identified episodes to said data that categorizes said standard operating procedure data or historical data of operational changes; and
   g. further identifying identified episodes that differ from said standard operating procedure data or historical data of operational changes and listing said identified episodes that differ as inadvertent operations.

2. The method of claim 1 wherein said identified episodes comprise opposite changes in direction within a short period of time.

3. The method of claim 1 wherein said identified episodes comprise a reversal of a direction of operation.

4. The method of claim 1 wherein said identified episodes comprise a toggling of a value between a current state and a previous state wherein said toggling duration is determined to be less than a minimum value determined based upon a comparison of said standard operating procedure or said historical data of operational changes.

5. The method of claim 1 wherein said toggling duration is less than a minimum operation effect time defined as a combination of controller delay, process delay and instrumentation delay.

6. The method of claim 1 wherein the triggering event includes at least one of
   a. an alarm that occurs at the industrial plant;
   b. a warning that occurs at the industrial plant;
   c. a maintenance event that occurs at the industrial plant;
   d. a device failure that occurs at the industrial plant;
   e. a programming event that occurs at the industrial plant;
   f. and a violation of an operational rule of the industrial plant.

7. The method of claim 1 further comprising generating a training module, based on providing a simulation of the inadvertent operations in which at least one identified episode occurred.

8. An electronic device comprising:
   a. a receiver configured to collect information associated with operational changes by personnel that operate an industrial plant;
   b. a processor operably coupled to the receiver, wherein the processor is configured to:
      i. identify episodes of the operational changes, wherein each episode includes a triggering event and the operational changes performed by each of the personnel in response to the triggering event;
      ii. generate a causal pairing matrix that categorizes the identified episodes into a plurality of groupings, wherein each of the groups includes at least two episodes that are related based on the triggering event of each of the at least two episodes being similar;
      iii. compare each of the plurality of groupings to either standard operating data or historical data;
      iv. analyze the at least two episodes to determine whether the at least two episodes fit within an analysis of said standard operating data or said historical data, within each of the groups;
      v. generate a report for the plurality of groupings, wherein the report indicates whether a ranking of data is an inadvertent operation based upon said ranking of data having been determined to exhibit one or more attributes of inadvertent operation.

9. The electronic device of claim 8 wherein said analysis of at least two episodes concludes that a value was toggled from one position to a second position at a rate more rapid than said standard operating data or said historical data.

10. The electronic device of claim 9 wherein said value was changed at a more frequent rate than expected from said analysis.

11. The electronic device of claim 9, wherein to generate the causal pairing matrix, the processor is configured to:
   detect patterns from the collected information including:
      the triggering event associated with the identified episodes, the operational changes associated with the identified episodes, a set of operational history associated industrial plant, and
      operational rules of the industrial plant associated with the identified episodes; and
   derive a probability rating based on the detected patterns, wherein the probability rating indicates whether the personnel performed an inadvertent operational change in response to a particular triggering event.

12. The electronic device of claim 8 wherein the triggering event is selected from at least one of:
   a. an alarm that occurs at the industrial plant;
   b. a warning that occurs at the industrial plant;
   c. a maintenance event that occurs at the industrial plant;
   d. a device failure that occurs at the industrial plant;
   e. a programming event that occurs at the industrial plant;
   f. and a violation of an operational rule of the industrial plant.

* * * * *